N. W. McLEOD.
METHOD OF MAKING PNEUMATIC TIRES.
APPLICATION FILED SEPT. 18, 1916.
1,328,006.
Patented Jan. 13, 1920.
5 SHEETS—SHEET 3.
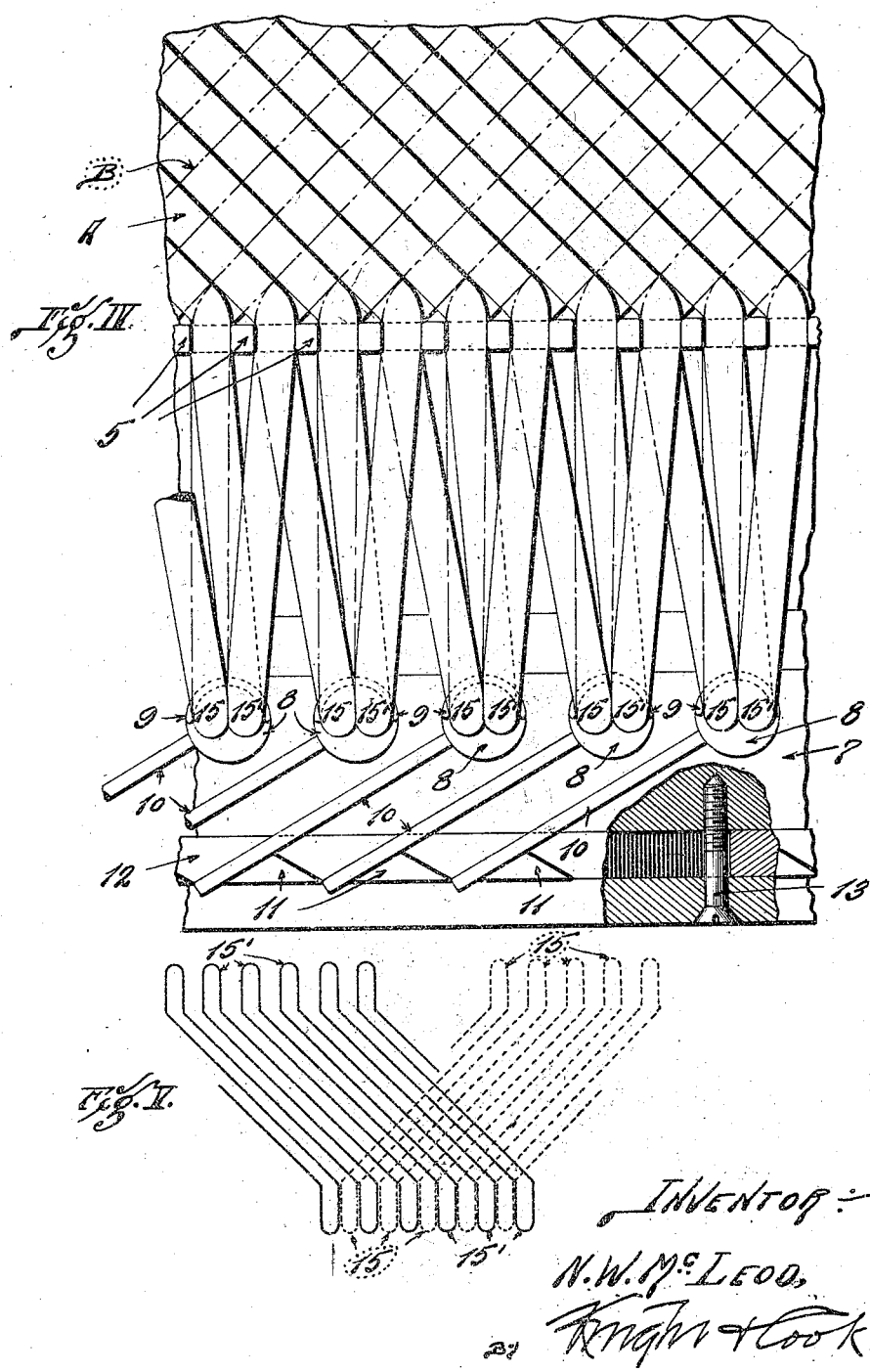

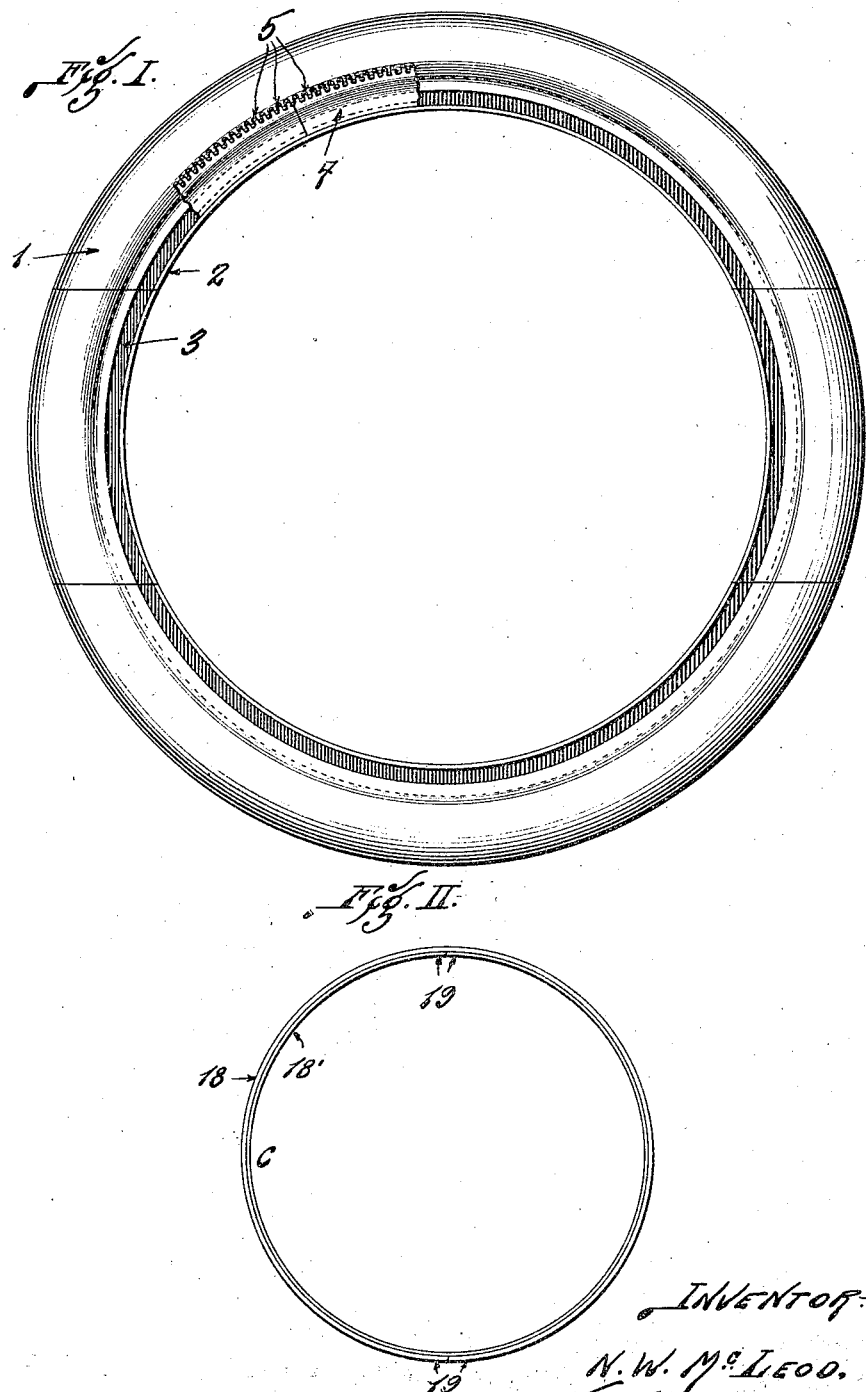

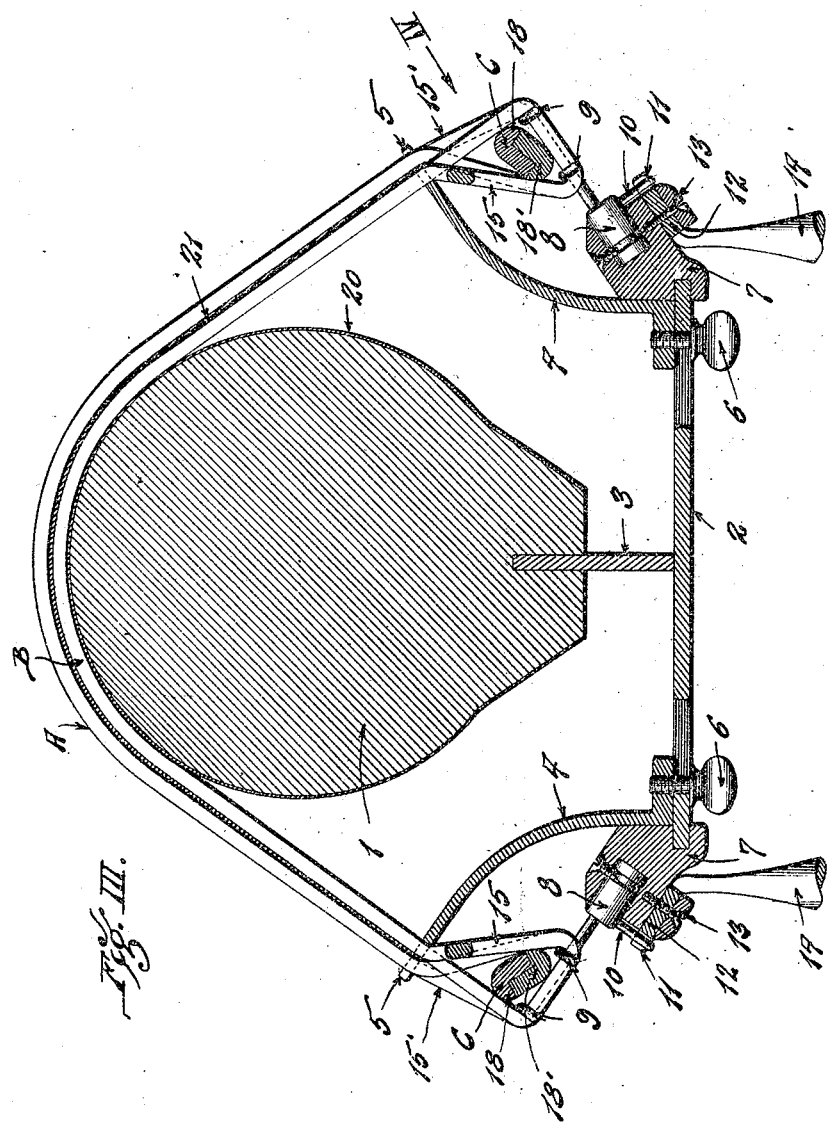

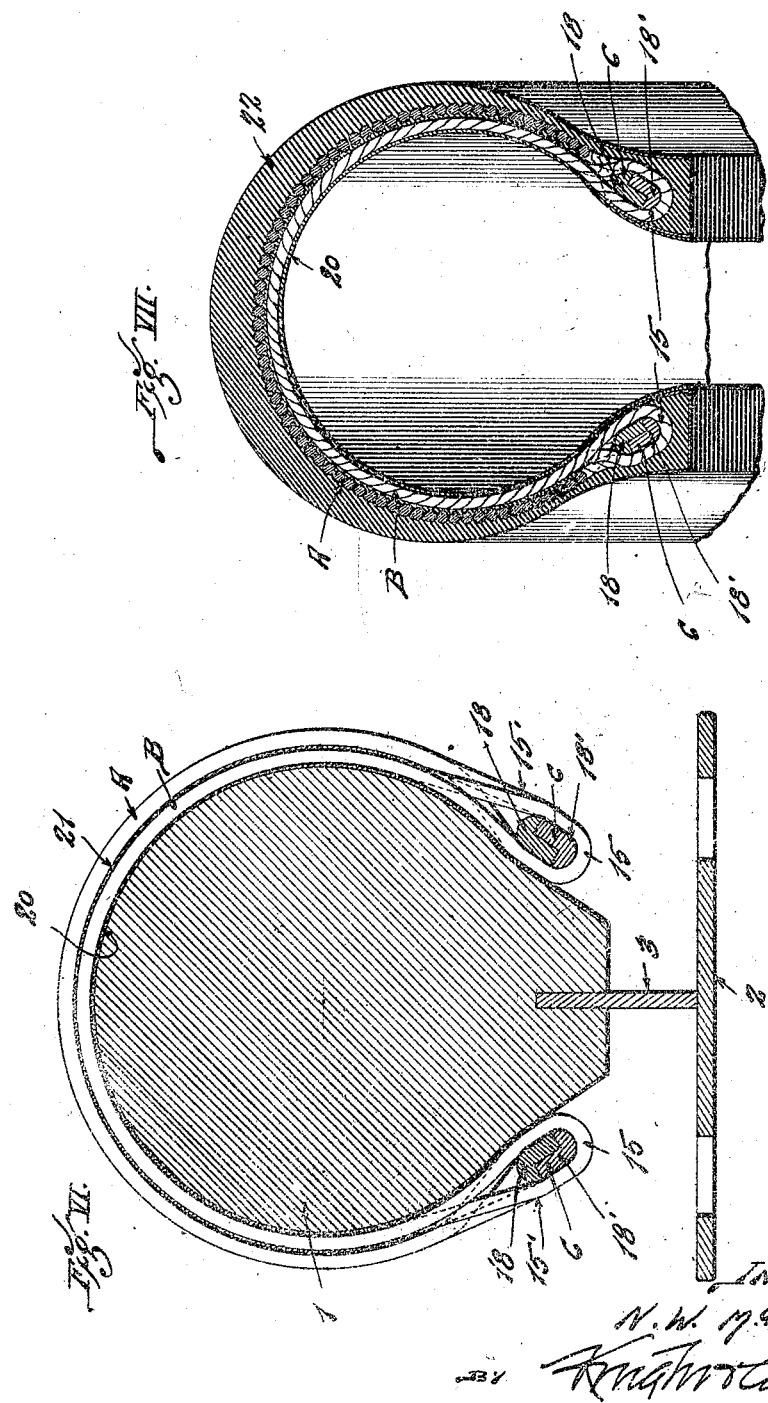

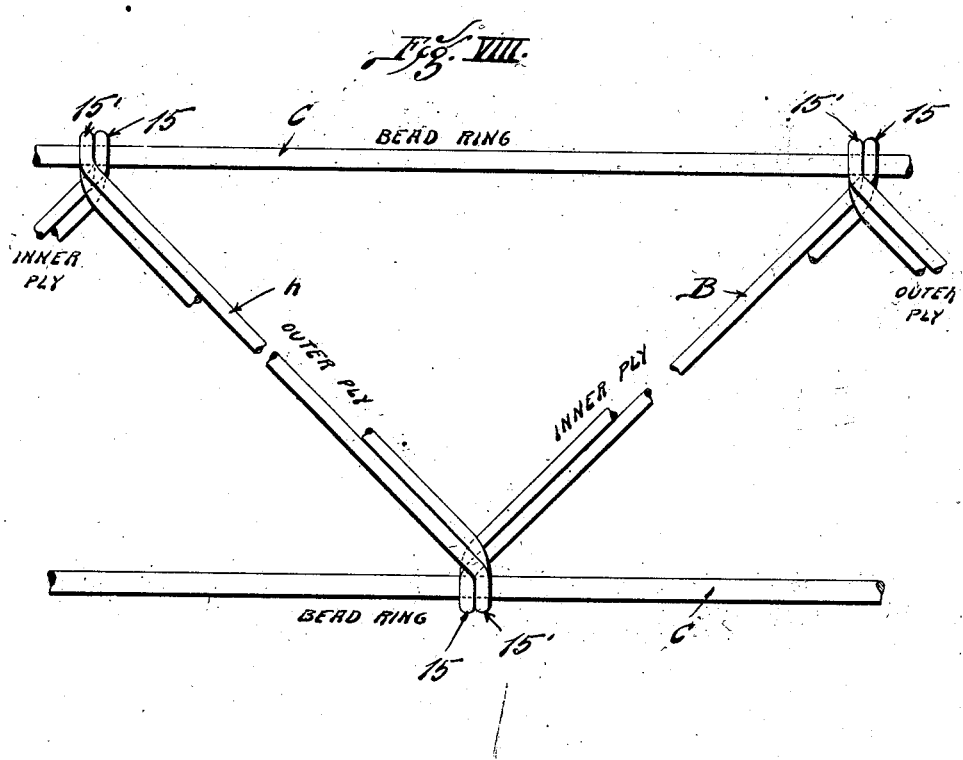
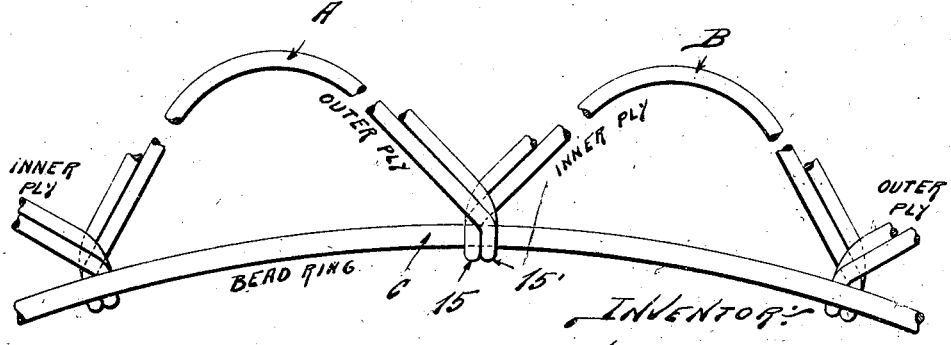

UNITED STATES PATENT OFFICE.

NELSON W. McLEOD, OF ST. LOUIS, MISSOURI.

METHOD OF MAKING PNEUMATIC TIRES.

1,328,006.　　　　Specification of Letters Patent.　　Patented Jan. 13, 1920.

Application filed September 18, 1916. Serial No. 120,685.

*To all whom it may concern:*

Be it known that I, NELSON W. McLEOD, a citizen of the United States of America, a resident of the city of St. Louis, State of Missouri, have invented certain new and useful Improvements in Methods of Making Pneumatic Tires, of which the following is a full, clear, and exact description, reference being had to the accompanying drawings, forming a part of this specification.

My invention relates to a method of making pneumatic tires, one of the objects being to provide a simple and inexpensive method of producing a strong and durable cord tire skeleton. In making my tire skeleton, loops are formed at the margins of a cord web, and one of the objects of the invention is to provide a simple method of anchoring these loops very firmly, thereby securely holding all of the cord elements at the margins of the cord web.

Figure I is a side elevation showing an annular cord-receiving core and a portion of the toothed loop retaining ring.

Fig. II is a side elevation of a sectional bead ring adapted to be inserted through a marginal portion of the cord web.

Fig. III is a transverse section taken through the annular core and also through the annular rows of cord holding elements associated therewith.

Fig. IV is an enlarged fragmentary diagrammatical view, looking in the direction indicated by arrow IV, in Fig. III.

Fig. V is a diagram, on a reduced scale, illustrating the method of winding the cord elements, the elements of the outer ply being shown by full lines, and the elements of the inner ply being shown by dotted lines.

Fig. VI is a transverse section showing a two-ply cord skeleton as it appears after the marginal loops have been removed from the annular rows of cord holding elements and shifted toward the annular core.

Fig. VII is a transverse section of the completed tire.

Fig. VIII is a diagrammatical plan view showing the manner in which the oppositely inclined cord elements are anchored on the bead rings.

Fig. IX is a side elevation of the parts shown in Fig. VIII.

Briefly stated, the method hereinafter described includes the steps of winding cord onto cord holding members to form a cord web having diagonal cord elements and loops at the ends of said cord elements; then winding cord diagonally of said cord web to form a second cord web having its cord elements inclined oppositely to the first mentioned cord elements, at the same time forming loops at the ends of the cord elements of the second web. The loops of each cord web are preferably arranged alternately between the loops of the other web. The eyes of the alternating loops are preferably in alinement with each other so that a cord retaining device may be readily inserted through the loops while the latter are held by the cord holding members. After the bead rings, or other suitable cord retaining members have been inserted through the alined loops, all of the loops may be released from the members on which they were formed. The oppositely inclined cord elements will then be anchored at the bead rings, as shown most clearly in Figs. VIII and IX. The final steps involved in making a tire are suggested by Figs. III, VI and VII.

To facilitate the description of my method, I have shown an apparatus comprising a collapsible annular core 1 conforming approximately to the shape of a tire, a collapsible or contractile ring 2 surrounded by said core, a separating ring 3 arranged between the core and the ring 2. The annular cord holding elements supported by the ring 2 include a pair of contactible loop retaining rings 4 (Figs. I, III and IV) arranged at opposite sides of the annular core 1 and provided with teeth 5 adapted to receive the cord elements, said rings 4 being adjustably secured to the ring 2 by means of set screws 6 as shown in Fig. III. Rings 7, fitted to the side margins of ring 2 (Figs. III and IV) are provided with pockets for the reception of annular rows of cylinders 8 provided with arcuate cord holding hooks 9. Each hook 9 is formed concentrically with the axis of the cylinder 8 to which it is secured (Fig. IV) and all of the cylinders 8 may be turned from the positions shown in the drawings for the purpose of releasing all of the cord loops from the hooks 9. The annular rows of hooks 9 are located at opposite sides of the plane of the annular core 1 and separated from the side faces of said annular core, as shown most clearly in Fig. III.

Each cylinder 8 is provided with an operating arm 10 (Figs. III and IV) which lies between two of the teeth 11 on an operating ring 12. Screws 13, passing through slots in the operating ring 12, secure said ring to the ring 7. Operating handles 14, extending from the rings 12, may be actuated to turn said rings 12, thereby shifting the operating arms 10 so as to turn the cylinders 8 and hooks 9. The hooks 9 occupy the positions shown in Figs. III and IV during the winding operations.

The tire skeleton I have shown comprises an outer cord web A which overlies an inner cord web B, and bead rings C passing through loops 15 and 15' at the side margins of the cord webs. The inner web is formed by winding cord diagonally of the annular core, from the hooks 9 at one side of the core to the hooks 9 at the opposite side thereof. The cord is wound onto the hooks 9 and inserted between the teeth 5 on the loop retaining rings 4, thereby forming the loops 15 which lie at angles to the diagonal cord elements, as shown in Figs. III and IV. The loops are thus turned in a very simple manner to place their eyes in circumferential alinement. Two circular rows of loops 15 are formed at the respective margins of the cord web B, and the open eyes of the loops at each margin are alined with each other so that a cord retaining device or bead ring, may be readily inserted through the loops.

The outer cord web A is a formed by winding cord diagonally of the core from the hooks 9 at one side to the hooks 9 at the opposite side of the core. The diagonal cord elements of the outer cord web are inclined oppositely to the diagonal elements of the inner web. In making the outer web, loops 15' are formed on the hooks 9, the outer end of each loop 15' being closely fitted to a loop 15 of the inner web. The loops 15' are arranged alternately between the loops 15 (Fig. IV) for a purpose which will be hereinafter pointed out.

The diagonal cord elements of each web lie close to each other as shown in Fig. IV, and although the margins of the cord webs are formed in a circular space considerably smaller than the circle at the periphery of the core, it will be noted that the cord is not severely compressed or crowded at the margins of the webs. This is due to the manner in which the loops are formed at the marginal portions of the web. Each loop forms a continuation of two diagonal cord elements, but the terminal of each loop lies in the smaller circle of the annular structure, and in this circle it occupies a space equal to the thickness of only one cord. In other words, each loop is composed of two diverging portions (Fig. IV) which occupy a comparatively small space at the inner circle of the web. This is an advantage in winding the cord, and it also improves the finished article.

I do not deem it necessary to show the mechanical winding device whereby the cord is placed on the cord holding elements, for this may be done by any suitable mechanism, and it is possible to wind the cord by hand.

To facilitate the winding operations, the cord holding elements at the margins of the cord skeleton, are separated from the sides of the annular core 1. This allows the marginal cord elements to be formed at a point remote from the core, and in a plane where the loops may be readily formed on the hooks 9 and loop retainers 4. After the annular skeleton has been formed in this manner, its side marginal portions extend toward the axis of the annular core and away from the side faces of the core, as seen in Fig. III.

Since all of the cord loops 15 and 15' at each margin of the skeleton are held in circumferential alinement with each other by the hooks 9 and loop retainers 4, the bead rings C may be readily inserted through these loops. Each bead ring (Figs. II and III) is preferably a sectional device comprising two circular sections 18 and 18' each having free ends 19 adapted to be separated from each other and inserted through the alined loops 15 and 15'. To avoid the necessity of fastening the ends of the circular sections after they have been inserted through the loops, the free ends 19 of one of said sections are located at points remote from the free ends of the other section as shown in Fig. II. It will be noted that the bead rings constitute a very simple means for retaining the cord loops in the relative positions shown in the drawings.

After the loops have been secured by the bead rings, the cylinders 8 are turned to release the hooks 9 from the loops. The rings 4 and 7 are then removed from the main supporting ring 2. Thereafter, the margins of the cord skeleton are forced onto the annular tire forming core 1 as shown in Fig. VI. When the hooks 9 and rings 4 are released from the loops, the margins of the skeleton are free and somewhat loose, but this looseness is eliminated by forcing the bead rings C toward the core and placing the skeleton on the curved side faces of the core, so as to bow the cord elements outwardly at the sides of the core.

The cord is preferably rubberized before it is wound onto the core holding elements, and the other rubber elements include, a sheet of raw rubber 20 covering the core, a sheet of raw rubber 21 interposed between the cord webs, and a main body of raw rubber 22 (Fig. VII) covering the skeleton at the tread, sides and beads of the tire.

All of these rubber elements may be applied to the skeleton while it is held on the collapsible annular core 1, and the raw tire may be vulcanized in any suitable manner.

Figs. VIII and IX are fragmentary diagrams showing the manner in which the oppositely inclined cord elements are anchored at the bead rings. The loops 15 of the inner cord web are arranged alternately between loops 15' of the outer cord web, as previously pointed out, each loop 15 being firmly fitted to a companion loop 15'. The service stresses, placing the oppositely inclined cord elements under tension, are very effectively resisted by the loops and bead rings, each loop serving as a firm anchor which prevents its companion loop from being pulled from a fixed position on the bead ring. Furthermore, the loops are so turned that the cord elements will not be packed or crowded at the beads of the tire.

I claim:—

1. The method of making annular cord tire skeletons which comprises winding cord onto cord holding elements to form a cord web having marginal loops at said elements, inserting circular cord retaining members into the marginal loops, and releasing said loops from said cord holding elements.

2. The method of making annular cord tire skeletons which comprises winding cord onto cord holding elements to form a cord web having marginal loops at said elements, at the same time turning said loops to place their eyes in circumferential alinement, releasing thereafter said loops from the cord holding elements, and forming beads at the alined loops.

3. The method of making annular cord tire skeletons which comprises winding the cord onto annular rows of cord holding elements to form a cord web having marginal loops on said cord holding elements, at the same time forming the eyes of the loops at each margin in alinement with the eyes of the other loops at the same margin, and thereafter inserting circular cord retaining devices through the alined loops.

4. The method of making annular cord tire skeletons which comprises winding the cord onto annular rows of cord holding elements to form a cord web having marginal loops on said cord holding elements, at the same time forming the eyes of the loops at each margin in alinement with the eyes of the other loops at the same margin, and thereafter inserting circular cord retaining devices through the alined loops, and withdrawing the annular rows of cord holding elements from the loops.

5. The method of making annular cord tire skeletons which comprises winding cord onto annular rows of cord holding hooks to form a cord web having loops at said hooks, turning the hooks to release them from the loops, removing the hooks from the structure, and forming beads at said loops.

6. The method of making annular cord tire skeletons which comprises winding cord onto annular rows of cord holding hooks to form a cord web having loops at said hooks, inserting bead rings through the loops, and thereafter shifting said hooks to release the loops therefrom.

7. The method of making annular cord tire skeletons which comprises winding cord onto annular rows of cord holding members to form a cord web having marginal loops at said members, winding cord onto the same cord holding members to form a second cord web which overlies the first mentioned cord web, forming the eyes of the loops of the second web in circumferential alinement with the eyes of loops of the other web, and thereafter inserting a circular cord retaining device through the alined loops.

8. The method of making annular cord tire skeletons which comprises winding cord onto annular rows of cord holding members to form a cord web having marginal loops at said members, winding cord onto the same cord holding members to form a second cord web which overlies the first mentioned cord web, forming the eyes of the loops of the second web in circumferential alinement with the eyes of loops of the other web, inserting a circular cord retaining device through the alined loops, and thereafter removing said annular rows of cord holding members from the loops.

9. The method of making annular cord tire skeletons which comprises winding cord onto circular cord holding elements to form a cord web having marginal loops, winding cord diagonally of said cord web to produce a second cord web having marginal loops, at the same time arranging loops of the second web between loops of the other web, releasing said circular cord holding elements from said loops and anchoring said loops in tire beads.

10. The method of making annular cord tire skeletons which comprises winding cord onto annular rows of cord holding members to form a cord web having marginal loops on said cord holding members and diagonal cord elements connecting said loops, winding cord diagonally of said cord web at an angle to the inclination of said cord elements to produce a second cord web which overlies the first mentioned cord web, at the same time placing the loops of the second web alternately between loops of the other web, and thereafter inserting a cord retaining device through said loops.

11. The method of making annular cord tire skeletons which comprises winding cord onto annular rows of cord holding members to form a cord web having marginal loops on said cord holding members and diagonal cord elements connecting said loops, winding cord diagonally of said cord web at an angle to the inclination of said cord elements to produce a second cord web which overlies the first mentioned cord web, at the same time placing the loops of the second web alternately between loops of the other web, inserting bead rings through the alternating loops at the respective margins of the double cord web, and removing said cord holding members from the loops.

12. The method of making annular cord tire skeletons which comprises winding cord onto cord holding members to form a cord web having diagonal cord elements and loops at the ends of said cord elements, winding cord diagonally of said cord web to form a second cord web having its cord elements inclined oppositely to the inclination of the first mentioned cord elements, at the same time forming loops at the ends of the cord elements of the second web and placing the loops at angles to the cord elements leading therefrom, arranging the loops of one web alternately between loops of the other web so as to form separated pairs of loops, each pair being a loop of one web firmly fitted to a loop of the other web so that both cord elements of each loop will be firmly held by a companion loop, and forming beads at said loops.

13. The method of making annular cord tire skeletons which comprises placing annular cord holding devices at opposite sides of the plane of an annular cord holding core, said annular cord holding devices being separated from said core and arranged in a circle smaller than the diameter of the peripheral face of the core, winding cord transversely of said core and from one of said annular cord holding devices to the other so as to form a cord web having its marginal portions separated from the core, and thereafter shifting the marginal portions of the cord web to the core.

14. The method of making annular cord tire skeletons which comprises placing annular rows of cord holding members at opposite sides of the plane of an annular core, said annular rows of cord holding members being separated from the side faces of the core, winding cord transversely of the peripheral face of said core and from one of the annular rows of cord holding members to the other so as to form an annular cord web having marginal portions which extend inwardly and away from the side faces of the core, thereafter shifting said marginal portions of the cord web to the side faces of the core and shaping said marginal portions on said side faces.

15. The method of making annular cord tire skeletons which comprises placing annular rows of cord holding members at opposite sides of the plane of an annular core, said annular rows of cord holding members being separated from the side faces of the core, winding cord transversely of the peripheral face of said core and from one of the annular rows of cord holding members to the other so as to form an annular cord web having marginal portions which extend inwardly and away from the side faces of the core, inserting bead rings into the edges of the cord web, thereafter moving said bead rings toward the side faces of the core, and shaping said marginal portions of the cord web on the side faces of the core.

NELSON W. McLEOD.